3,745,223
ANTI-INFLAMMATORY AGENTS

Winston S. Marshall, Indianapolis, Ind., assignor to Eli Lilly and Company, Indianapolis, Ind.
No Drawing. Continuation-in-part of application Ser. No. 91,559, Nov. 20, 1970, which is a continuation-in-part of application Ser. No. 888,802, Dec. 29, 1969, both now abandoned. This application Mar. 29, 1971, Ser. No. 129,237
Int. Cl. A61k 27/00
U.S. Cl. 424—353
25 Claims

ABSTRACT OF THE DISCLOSURE

Methods of treating various conditions involving inflammation and its concomitant swelling, tenderness, decreased mobility, pain, and fever, employing an aralkyl hydrocarbon as the active anti-inflammatory agent.

Cross reference

This application is a continuation-in-part of my pending application Ser. No. 91,559, filed Nov. 20, 1970, which is a continuation-in-part of my prior application Ser. No. 888,802, filed Dec. 29, 1969, both now abandoned.

Background of the invention

Mammals, both humans and animals. are known to suffer from various conditions involving inflammation and its concomitant swelling, tenderness, decreased mobility, pain, and fever. While there are a number of anti-inflammatory agents which are effective in the symptomatic treatment of inflammatory conditions such as rheumatoid arthritis, rheumatoid spondylitis, osteoarthritis, degenerative joint diseases, and the like, such agents have been found to have a number of undesirable side effects, among them gastric irritation. Thus, the search for improved anti-inflammatory agents continues.

The present invention provides a method of treating inflammation in humans and animals by employing an appropriate aralkyl hydrocarbon as the anti-inflammatory agent. The compounds employed in the practice of this invention appear to be relatively free from the serious gastric side effects produced by a number of commercially available anti-inflammatory agents.

Summary of the invention

This invention relates to a method of treating inflammation and the resulting pain and fever in mammals, both humans and animals. More particularly, this invention provides a method of treating inflammatory disorders which comprises administering to a subject suffering from such condition from 1 to 100 mg./kg. of body weight daily of an aralkyl compound represented by the formula $$Ar-R$$

wherein:

Ar represents an aryl moiety selected from the group consisting of 3-phenoxyphenyl, 4-phenoxyphenyl, 3-phenylthiophenyl, 4 - phenylthiophenyl, 4-cyclohexylphenyl, 4 - (1 - cyclohexenyl)phenyl, 4 - biphenylyl, 4 - iso-butylphenyl, 4 - cyclohexyl - 3 - chlorophenyl, 3 - methyl - 4 - phenoxyphenyl, or 3 - methoxy-4-phenoxyphenyl, 4 - iso-propylphenyl, 4 - (1 - cyclooctenyl)phenyl, 4 - cyclooctylphenyl, 4' - fluorobi- phenylyl, 4 - tert-butylphenyl, 6 - methoxy - 2-naphthyl, 4 - (2 - norbornyl)phenyl, 5-indanyl, 3-chloro-4-allyloxyphenyl, 4 - n-propylphenyl, 4 - n-butylphenyl, 4-sec-butylphenyl, 4 - cyclopentylphenyl, 4 - neo-pentylphenyl, 2 - phenyl - 5 - pyridyl, 4 - (2'-pyridyl)phenyl, 4 - cyclobutylphenyl, and 5-phenyl-2-thienyl; and R represents iso-propyl, iso-propenyl, iso-butyl, or n-butyl, with the limitations that when R is n-butyl, Ar is 4-biphenylyl, and when R is iso-butyl, Ar is 4-phenoxyphenol.

A number of the compounds represented by the above formula have been reported to be plasticizers (U.S. 2,786,040), or cooling and moderating agents for neutronic reactors (U.S. 2,902,425). However, their anti-inflammatory activity is wholly unexpected.

This invention also provides pharmaceutical formulations containing one or more of the above described compounds in unit dosage form for treating inflammatory conditions in mammals.

Detailed description of the invention

According to the method of this invention, symptomatic relief of inflammation and the accompanying swelling, tenderness, decreased mobility, pain and fever is provided when from 1 to 100 mg./kg. of body weight daily of an aralkyl compound, as defined herein, is administered to humans and animals suffering from an inflammatory condition by either oral or parenteral routes.

The aralkyl hydrocarbons useful in the practice of this invention are represented by the formula $$Ar-R$$

wherein:

Ar represents an aryl moiety selected from the group consisting of 3-phenoxyphenyl, 4 - phenoxyphenyl, 3-phenylthiophenyl, 4 - phenylthiophenyl, 4-cyclohexylphenyl, 4 - (1 - cyclohexenyl)phenyl, 4 - biphenylyl, 4 - iso-butylphenyl, 4 - cyclohexyl - 3 - chlorophenyl, 3 - methyl - 4 - phenoxyphenyl, or 3 - methoxy - 4-phenoxyphenyl, 4-iso-propylphenyl, 4-(1-cyclooctenyl) phenyl, 4-cyclooctylphenyl, 4' - fluorobiphenylyl, 4-tert-butylphenyl, 6 - methoxy - 2 - naphthyl, 4 - (2-norbornyl)phenyl, 5 - indanyl, 3 - chloro - 4 - allyloxyphenyl, 4 - n-propylphenyl, 4 n-butylphenyl, 4-sec-butylphenyl, 4 - cyclopentylphenyl, 4 - neo-pentylphenyl, 2 - phenyl - 5 - pyridyl, 4 - (2' - pyridyl)phenyl, 4-cyclobutylphenyl, and 5-phenyl-2-thienyl; and R represents iso-propyl, iso-propenyl, n-butyl, or iso-butyl, with the limitations that when R is n-butyl, Ar is 4-biphenylyl, and when R is iso-butyl, Ar is 4-phenoxyphenyl.

Included among the compounds useful in the practice of this invention are 3-phenoxy-α-methylstyrene
3-phenoxycumene
4-phenoxy-α-methylstyrene
4-phenoxycumene
4-iso-butyldiphenyl ether
4-n-butylbiphenyl
4-phenylcumene
4-iso-butyl-α-methylstyrene
4-iso-butylcumene
3-phenylthio-α-methylstyrene
4-phenylthio-α-methylstyrene 4-cyclohexyl-α-methylstyrene
4-cyclohexylcumene
3-chloro-4-cyclohexyl-α-methylstyrene
3-methyl-4-phenoxy-α-methylstyrene
3-methoxy-4-phenoxycumene
4-iso-propyl-α-methylstyrene
4-iso-propylcumene
4-n-propylcumene
4-n-butyl-α-methylstyrene
4-sec-butyl-α-methylstyrene
1-(4-cumenyl)cyclooctene
4-cyclooctylcumene
4-(4-fluorophenyl)-α-methylstyrene
4-(3-fluorophenyl)-α-methylstyrene
4-(4-fluorophenyl)cumene
4-(3-fluorophenyl)cumene
3-methoxy-4-phenoxy-α-methylstyrene
2-iso-propenyl-6-methoxynaphthalene
4-tert-butyl-α-methylstyrene
4-(2-norbornyl)cumene
5-iso-propenylindane
3-chloro-4-allyloxy-α-methylstyrene
4-cyclopentylcumene
4-(1-cyclohexenyl)cumene
4-neo-pentylcumene
2-phenyl-5-isopropenylpyridine
2-phenyl-5-isopropylpyridine
4-cyclobutylcumene
4-phenyl-α-methylstyrene
4-cyclobutyl-α-styrene
4-(2-pyridyl)cumene
2-isopropyl-5-phenylthiophene The compounds employed in the practice of this invention are excellent anti-inflammatory agents and are generally free from the usual gastric side effects seen with other such agents. Examples of such anti-inflammatory activities are given in the table which follows. The oral $ED_{50}$'s, expressed in mg./kg., of the compounds employed in this invention, as determined in the erythema blocking assay carried out essentially according to the method reported by Winder, C. V. et al., Archives Int. Pharmacodym, vol. 116, p. 261 (1958), are shown in the following table.

TABLE I

| Ar | R | Oral $ED_5$ (mg./kg.) |
|---|---|---|
| 3-phenoxyphenyl | Iso-propenyl | 5 |
| Do | Iso-propyl | 25 |
| 4-phenoxyphenyl | Iso-propenyl | 15 |
| Do | Iso-propyl | 6 |
| Do | Iso-butyl | 20 |
| 4-biphenylyl | n-Butyl | 10 |
| Do | Iso-propyl | 4 |
| 4-iso-butylphenyl | Iso-propenyl | 40 |
| Do | Iso-propyl | 8 |
| 3-phenylthiophenyl | Iso-propenyl | 50 |
| 4-phenylthiophenyl | do | 30 |
| 4-cyclohexylphenyl | do | 35 |
| Do | Iso-propyl | 15 |
| 4-(1-cyclohexenyl)phenyl | do | 50 |
| 3-methyl-4-phenoxyphenyl | Iso-propenyl | 50 |
| 3-methoxy-4-phenoxyphenyl | Iso-propyl | 15 |
| 4-n-propylphenyl | do | 50 |
| 4-iso-propylphenyl | Iso-propenyl | 25 |
| Do | Iso-propyl | 0.8 |
| 4-(1-cyclooctenyl)phenyl | do | 25 |
| 4-cyclooctylphenyl | do | 5 |
| 4'-fluorobiphenylyl | Iso-propenyl | 23 |
| Do | Iso-propyl | 50 |
| 3-methoxy-4-phenoxyphenyl | Iso-propenyl | 22 |
| 6-methoxy-2-naphthyl | do | 25 |
| 3-chloro-4-allyloxyphenyl | do | 50 |
| 4-n-butylphenyl | do | <50 |
| 4-sec-butylphenyl | do | 25 |
| 4-cyclopentylphenyl | Iso-propyl | 50 |
| 4-neo-pentylphenyl | do | 25 |
| 4-tert-butylphenyl | do | 20 |
| 4-(2-norbornyl)phenyl | Iso-propenyl | 100 |
| 5-indanyl | Iso-propenyl | 50 |

Generally speaking, the compounds employed in the practice of this invention are prepared by methods well known in the art for the preparation of aralkyl hydrocarbons. The compounds employed herein can be prepared from an appropriate arylcarboxylic acid or acetophenone according to the following reaction schemes. Hereinbelow Ar is an aryl moiety as defined in the generic formula and $R^1$ represents lower alkyl.

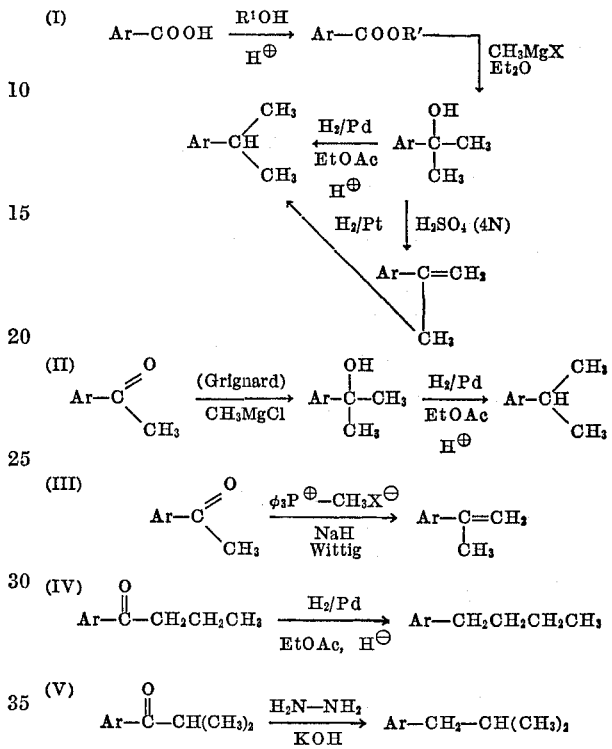

Another aspect of this invention contemplates and provides a pharmaceutical preparation in dosage unit form adapted for administration to obtain an anti-inflammatory effect comprising per dosage unit, an anti-inflammatory effective, non-toxic amount within the range from about 50 to about 1000 milligrams of at least one compound of the formula Ar—R as defined herein above, and a pharmaceutical diluent. A preferred pharmaceutical formulation is one adapted for oral administration and would include the administration of the compound in soft gelatin capsules, hard gelatin capsules, and tablet formulations illustrated below. A preferred compound for administration in accordance with this aspect of the invention is 4-phenylcumene, but other compounds listed above can be substituted for part or all of the 4-phenylcumene.

The above compounds can be prepared by methods well known in the art. The following examples illustrate methods which can be employed in preparing the compounds useful in the practice of this invention.

EXAMPLE 1

Preparation of 2-(4-biphenylyl)-2-propanol

A solution of 98 g. of 4-acetylbiphenyl, dissolved in 500 ml. of ether and 500 ml. benzene, was added dropwise, with stirring, to 500 ml. of a 2.15 molar solution of methyl magnesium chloride which had been diluted with an equal volume of ether, at such a rate that the reaction refluxed gently. After the addition was completed, the reaction was refluxed gently overnight.

The reaction was then allowed to cool to room temperature, and the excess Grignard reagent was decomposed by the dropwise addition of 178 ml. of a saturated ammonium chloride solution. The organic layer was decanted from the resulting inorganic residue and poured into ice water. The organic layer was then separated, washed with dilute sodium bicarbonate solution and water, and dried over sodium sulfate. Evaporation of the solvents in vacuo left a white solid residue which was recrystallized from hexane to yield 85 g. of 2-(4-biphenylyl)-2-propanol, M.P. 88.5–90.5° C.

*Analysis.*—Calcd. for $C_{15}H_{16}O$ (percent): C, 84.87; H, 7.60. Found (percent): C, 85.01; H, 7.54. This compound can be used to prepare 4-phenyl-α-methylstyrene by the method of Example 13.

EXAMPLES 2–12

The following compounds were prepared according to the method of Example 1, from the corresponding acetophenone or substituted benzoate ester, using appropriate amounts of methyl magnesium halide solution:

2-(4 - phenoxyphenyl)-2-propanol, B.P. 148–152°/0.2 mm.; $n_D^{25}$=1.5760, from 4-phenoxyacetophenone.

*Analysis.*—Calcd. for $C_{15}H_{16}O_2$ (percent): C, 78.92; H, 7.06. Found (percent): C, 78.91; H, 7.09.

2-(3-phenylthiophenyl) - 2 - propanol, B.P. 154–156°/0.05 mm.; $n_D^{23}$=1.6132, from 3-phenylthioacetophenone.

*Analysis.*—Calcd. for $C_{15}H_{16}OS$ (percent): C, 73.72; H, 6.60; S, 13.12. Found (percent): C, 73.46; H, 6.63; S, 13.35.

2-(4-phenylthiophenyl)-2-propanol, B.P., 144–153° C./0.09 mm.; $n_D^{25}$=1.6154, from 4-phenylthioacetophenone.

*Analysis.*—Calcd. for $C_{15}H_{16}OS$ (percent): C, 73.72; H, 6.60; S, 13.12. Found (percent): C, 73.99; H, 6.89; S, 12.91.

2-(4-iso - butylphenyl)-2-propanol, B.P., 77–85°/0.16 mm.; $n_D^{25}$=1.5050, from 4-iso-butylacetophenone.

*Analysis.*—Calcd. for $C_{13}H_{20}O$ (percent): C, 81.20; H, 10.48. Found (percent): C, 80.97; H, 10.52.

2-(4-sec - butylphenyl)-2-propanol, B.P., 73–80°/0.05 mm.; $n_D^{23}$=1.5094, from 4-sec-butylacetophenone.

*Analysis.*—Calcd. for $C_{13}H_{20}O$ (percent): C, 81.20; H, 10.48. Found (percent): C, 81.09; H, 10.71.

2-(4 - cyclohexylphenyl)-2-propanol, M.P., 71–74° C., from 4-cyclohexylacetophenone.

*Analysis.*—Calcd. for $C_{15}H_{22}O$ (percent): C, 82.51; H, 10.16. Found (percent): C, 82.49; H, 10.04.

2-(3-methoxy-4-phenoxyphenyl)-2-propanol, B.P., 170–177°/0.07 mm.; $n_D^{25}$=1.5762, from 3-methoxy-4-phenoxyacetophenone.

*Analysis.*—Calcd. for $C_{16}H_{18}O_3$ (percent): C, 74.39; H, 7.02. Found (percent): C, 74.58; H, 7.29.

2-(3-methyl-4-phenoxyphenyl)-2-propanol, B.P., 145–146°/0.08 mm.; $n_D^{25}$=1.5705, from 3-methyl-4-phenoxyacetophenone.

*Analysis.*—Calcd. for $C_{16}H_{18}O_2$ (percent): C, 79.31; H, 7.49. Found (percent): C, 79.47; H, 7.63.

2-(4-tert-butylphenyl) - 2 - propanol, M.P., 75–76.5°, from ethyl 4-tert-butylbenzoate.

*Analysis.*—Calcd. for $C_{13}H_{20}O$ (percent): C, 81.20; H, 10.48. Found (percent): C, 80.98; H, 10.58.

2-(4' - fluorobiphenylyl)-2-propanol, M.P., 110–111°, from 4'-fluoro-4-acetylbiphenyl.

*Analysis.*—Calcd. for $C_{15}H_{15}FO$ (percent): C, 78.24; H, 6.57. Found (percent): C, 77.95; H, 6.79.

2 - (6-methoxy-2-naphthyl)-2-propanol, M.P., 83–86°, from 2-acetyl-6-methoxynaphthalene.

*Analysis.*—Calcd. for $C_{14}H_{16}O_2$ (percent): C, 77.75; H, 7.46; O, 14.79. Found (percent): C, 77.54; H, 7.22; O, 14.96. These alcohols are converted to the α-methylstyrenes by the acid method exemplified in Example 13.

EXAMPLE 13

Preparation of 4-phenyl-α-methylstyrene

A suspension of 42.4 g. of 2-(4-biphenylyl)-2-propanol in 100 ml. of 4 N sulfuric acid and 50 ml. of ethanol was refluxed and stirred vigorously for 1.5 hours. Then 50 ml. of ethanol was added, and the reaction was refluxed with stirring for an additional 2.5 hours. After being cooled to room temperature, the reaction mixture was poured into ice water and extracted with ether, benzene, and chloroform. The organic extracts were combined, washed with sodium bicarbonate solution and water, and dried over sodium sulfate. After evaporation of the solvents in vacuo, the residue was crystallized from hexane to yield 23.4 g. of 4-phenyl-α-methylstyrene, M.P. 116–118° C.

*Analysis.*—Calcd. for $C_{15}H_{14}$ (percent): C, 92.74; H, 7.26. Found (percent): C, 92.45; H, 6.98.

EXAMPLES 14–26

The following compounds were prepared according to the method of Example 13, using the corresponding propanol as the starting material:

4-phenoxy-α-methylstyrene, B.P., 120–126°/0.08 mm.; $n_D^{25}$=1.5934, from 2-(4-phenoxyphenyl)-2-propanol.

*Analysis.*—Calcd. for $C_{15}H_{14}O$ (percent): C, 85.68; H, 6.71. Found (percent): C, 85.44; H, 6.87.

3-phenylthio - α - methylstyrene, B.P., 113–115°/0.05 mm.; $n_D^{24}$=1.6248 which contained 10 percent starting carbinol as measured by NMR from 2-(3-phenylthiophenyl)-2-propanol.

4-phenylthio-α-methylstyrene, B.P., 147–167°/0.2 mm.; $n_D^{25}$=1.6374, from 2-(4-phenylthiophenyl)-2-propanol.

*Analysis.*—Calcd. for $C_{15}H_{14}S$ (percent): C, 79.62; H, 6.24. Found (percent): C, 79.49; H, 6.64.

4-iso-butyl-α-methylstyrene, B.P., 75–100°/0.4 mm.; $n_D^{25}$=1.5182, from 2-(4-iso-butylphenyl)-2-propanol.

*Analysis.*—Calcd. for $C_{13}H_{18}$ (percent): C, 89.59; H, 10.41. Found (percent): C, 89.52; H, 10.49.

4-sec-butyl-α-methylstyrene, B.P., 52–53°/0.07 mm.; $n_D^{24}$=1.5188, from 2-(4-sec-butylphenyl)-2-propanol.

*Analysis.*—Calcd. for $C_{13}H_{18}$ (percent): C, 89.59; H, 10.41. Found (percent): C, 89.36; H, 10.43.

4-cyclohexyl - α - methylstyrene, B.P., 122–142°/0.15 mm.; $n_D^{25}$=1.5484, from 2-(4-cyclohexylphenyl)-2-propanol.

*Analysis.*—Calcd. for $C_{15}H_{20}$ (percent): C, 89.94; H, 10.06. Found (percent): C, 89.70; H, 10.13.

4 - (1 - cyclohexenyl)cumene, B.P., 148–160°/5 mm.; $n_D^{22}$=1.5452, from 1-(4-cumenyl)-1-cyclohexanol.

*Analysis.*—Calcd. for $C_{15}H_{20}$ (percent): C, 89.94; H, 10.06. Found (percent): C, 89.70; H, 10.13.

5 - (iso-propenyl)indane, B.P., 148–151°/5 mm.; $n_D^{25}$=1.5529, which was purified by preparative vapor phase chromatography, from 2-(5-indanyl)-2-propanol.

*Analysis.*—Calcd. for $C_{12}H_{14}$ (percent): C, 91.08; H, 8.92. Found (percent): C, 90.80; H, 8.84.

4-tert-butyl-α-methylstyrene, B.P., 105–115°/5 mm.; $n_D^{22}$=1.5184, from 2-(4-tert-butylphenyl)-2-propanol.

*Analysis.*—Calcd. for $C_{13}H_{18}$ (percent): C, 89.59; H, 10.41. Found (percent): C, 89.33; H, 10.20.

3 - methyl-4-phenoxy-α-methylstyrene, B.P., 125–134°/0.08 mm.; $n_D^{25}$=1.5856, from 2 - (3-methyl-4-phenoxyphenyl)-2-propanol.

*Analysis.*—Calcd. for $C_{16}H_{16}O$ (percent): C, 85.68; H, 7.19. Found (percent): C, 85.44; H, 7.06.

3-methoxy-4-phenoxy-α-methylstyrene, B.P., 157–160°/0.07 mm.; $n_D^{25}$=1.5914, from 2-(3-methoxy-4-phenoxyphenyl)-2-propanol.

*Analysis.*—Calcd. for $C_{16}H_{16}O_2$ (percent): C, 79.97; H, 6.71. Found (percent): C, 79.75; H, 6.76.

4 - (4-fluorophenyl)-α-methylstyrene, M.P., 127–128° from 2-(4'-fluorobiphenyl)-2-propanol.

*Analysis.*—Calcd. for $C_{15}H_{13}F$ (percent): C, 84.87; H, 6.17. Found (percent): C, 84.68; H, 6.45.

2 - iso-propenyl-6-methoxynaphthalene, M.P. 93–95° from 2-(6-methoxy-2-naphthyl)-2-propanol.

*Analysis.*—Calcd. for $C_{14}H_{14}O$ (percent): C, 84.81; H, 7.12; O, 8.07. Found (percent): C, 84.61; H, 7.10; O, 8.13.

EXAMPLE 27

Preparation of 3-phenoxy-α-methylstyrene

Methyl magnesium iodide was prepared by the dropwise addition of 228 g. of methyl iodide to a stirred suspension of 36.4 g. of magnesium in 1000 ml. of ether. A solution of 148 g. of 3-phenoxyacetophenone in 500 ml.

of ether was added dropwise, and the reaction mixture was then stirred at room temperature overnight and decomposed by the dropwise addition of 265 ml. of saturated ammonium chloride solution. After water was added, the reaction mixture was extracted with ether and ethyl acetate. The combined organic etxracts were washed with water and dried over sodium sulfate. Evaporation of the solvents left an oily residue which was distilled twice to yield 94.8 g. of 3-phenoxy-α-methylstyrene, B.P., 103–115°/0.08 mm.; $n_D{}^{25}$=1.5873.

*Analysis.*—Calcd. for $C_{15}H_{14}O$ (percent): C, 85.68; H, 6.71. Found (percent): C, 85.69; H, 6.90.

EXAMPLES 28–29

The following compounds were prepared according to the method of Example 27 using appropriate starting materials.

3 - chloro-4-allyloxy-α-methylstyrene, B.P., 99–105°/0.07 mm.; $n_D{}^{24}$=1.5623, from 3-chloro-4-allyloxyacetophenone.

*Analysis.*—Calcd. for $C_{12}H_{13}ClO$ (percent): C, 69.14; H, 6.29; O, 7.68. Found (percent): C, 69.23; H, 6.20; O, 7.85.

4 - n-butyl - α-methylstyrene, B.P. 84–88°/0.05 mm.; $n_D{}^{21}$=1.5182, from 4-n-butylacetophenone.

*Analysis.*—Calcd. for $C_{13}H_{18}$ (percent): C, 89.59; H, 10.41. Found (percent): C, 89.48; H, 10.48.

EXAMPLE 30

Preparation of 1-(4-cumenyl)cyclooctene

A solution of 4-cumenyl magnesium bromide was prepared by the dropwise addition of a solution of 70 g. of 4-bromocumene in about 250 ml. of ether to a stirred suspension of 8.75 g. of magnesium turnings in 50 ml. of ether to which a few drops of ethylene bromide had been added, at such a rate that gentle reflux was maintained. The reaction was stirred at room temperature for three hours. A solution of 38 g. of cyclooctanone in 250 ml. of ether was added dropwise and the reaction was refluxed overnight. After the reaction had cooled to room temperature, it was decomposed by the cautious addition of 60 ml. of saturated ammonium chloride solution. The ether layer was separated from the thus precipitated inorganic material by decantation. The inorganic residue was washed with ether and benzene. The combined organic solutions were washed with dilute hydrochloric acid and then with water and dried over sodium sulfate. After evaporation of the solvents in vacuo, the residue was distilled to yield 25.1 g. of 1-(4-cumenyl)cyclooctene, B.P., 128–140°/0.1 mm.; $n_D{}^{24.5}$=1.5459.

*Analysis.*—Calcd. for $C_{17}H_{24}$ (percent): C, 89.41; H, 10.59. Found (percent): C, 89.46; H, 10.77.

EXAMPLE 31

Preparation of 2-hydroxy-2-(4-cumenyl)norbornane 2-hydroxy-2-(4-cumenyl)norbornane, B.P., 137–145°/0.1 mm., which contained a trace of 2-(4-cumenyl)-2-norbornene was prepared in a manner similar to the procedure of Example 30 using appropriate amounts of 4-bromocumene, magnesium, and norcamphor.

EXAMPLE 32

Preparation of 1-(4-cumenyl)propanol

1 - (4 - cumenyl)propanol, B.P., 124–135°/5 mm.; $n_D{}^{22}$=1.5789, was prepared according to the method of Example 31 using appropriate amounts of 4-bromocumene, propionaldehyde, and magnesium.

*Analysis.*—Calcd. for $C_{12}H_{18}O$ (percent): C, 80.85; H, 10.18. Found (percent): C, 81.08; H, 9.92.

EXAMPLE 33

Preparation of 4-phenylcumene

A mixture of 21.2 g. of 2-(4-biphenylyl)-2-propanol, 4 g. of 5 percent Pd/C, 20 drops of $H_2SO_4$, and 200 ml. of ethyl acetate was hydrogenated until the calculated amount of hydrogen has been absorbed. After the catalyst was separated by filtration, the reaction mixture was washed successively with water, 5 percent $NaHCO_3$ solution, and water and dried over sodium sulfate. Evaporation of the solvent in vacuo left an oily residue which was distilled to yield 16.3 g. of 4-phenylcumene, B.P., 100–112°/0.09 mm.; $n_D{}^{24.5}$=1.5849.

*Analysis.*—Calcd. for $C_{15}H_{16}$ (percent): C, 91.78; H, 8.22. Found (percent): C, 92.06; H, 7.97.

EXAMPLES 34–42

The following compounds were prepared according to the method of Example 33 using the corresponding propanol benzyl alcohol, or styrene as the starting material:

4 - phenoxycumene, B.P., 104–110°/0.05 mm.; $n_D{}^{25}$=1.5591, from 2-(4-phenoxyphenyl)-2-propanol.

*Analysis.*—Calcd. for $C_{15}H_{16}O$ (percent): C, 84.87; H, 7.60. Found (percent): C, 84.80; H, 7.38.

4-phenylthiocumene, B.P., 135–141°/0.07 mm.;

$$n_D{}^{25}=1.6000,$$

from 2-(4-phenylthiophenyl)-2-propanol.

*Analysis.*—Calcd. for $C_{15}H_{16}S$ (percent): C, 78.89; H, 7.06. Found (percent): C, 78.81; H, 7.16.

4-n-propylcumene, B.P., 83–89°/5 mm.; $n_D{}^{22}$=1.4888, from 1-(4-cumenyl)-1-propanol.

*Analysis.*—Calcd. for $C_{12}H_{18}$ (percent): C, 88.82; H, 11.18. Found (percent): C, 88.72; H, 10.91.

4-iso-butylcumene, B.P., 52–69°/0.13 mm.;

$$n_D{}^{25}=1.9862,$$

from 2-(4-iso-butylphenyl)-2-propanol.

*Analysis.*—Calcd. for $C_{13}H_{20}$ (percent): C, 88.56; H, 11.44. Found (percent): C, 88.85; H, 11.34.

4-cyclopentylcumene, B.P., 120–130°/5 mm.;

$$n_D{}^{21}=1.5150,$$

from 4-(1-cyclopentenyl)cumene.

*Analysis.*—Calcd. for $C_{14}H_{20}$ (percent): C, 89.29; H, 10.71. Found (percent): C, 89.06; H, 10.79.

4-cyclohexylcumene, B.P. 105–110°/0.1 mm.;

$$n_D{}^{25}=1.5173,$$

from 2-(4-cyclohexylphenyl)-2-propanol.

*Analysis.*—Calcd. for $C_{15}H_{22}$ (percent): C, 89.04; H, 10.96. Found (percent): C, 89.27; H, 10.66.

4-cyclooctylcumene, B.P., 126–134°/0.1 mm.;

$$n_D{}^{24}=1.5230,$$

from 1-(4-cumenyl)cyclooctene.

*Analysis.*—Calcd. for $C_{17}H_{26}$ (percent): C, 88.62; H, 11.38. Found (percent): C, 88.38; H, 11.52.

4-(2-norbornyl)cumene, B.P., 150–156°/5 mm.;

$$n_D{}^{24}=1.5333,$$

from 2-hydroxy-2-(4-cumenyl)norbornane.

*Analysis.*—Calcd. for $C_{16}H_{22}$ (percent): C, 89.65; H, 10.35. Found (percent): C, 89.38; H, 10.20.

4-(4-fluorophenyl)cumene, M.P., 91–94°, from 2-(4'-fluorobiphenylyl)-2-propanol.

*Analysis.*—Calcd. for $C_{15}H_{15}F$ (percent): C, 84.08; H, 7.06; F, 8.86. Found (percent): C, 84.02; H, 6.92; F, 8.59.

EXAMPLE 43

Preparation of 3-phenoxycumene

A mixture of 21 g. of 3-phenoxy-α-methylstyrene, prepared according to Example 27, 1 g. of platinum oxide, and 200 ml. of ethanol was hydrogenated until the calculated amount of hydrogen had been absorbed. The catalyst was filtered and the filtrate was evaporated in vacuo. The residual oil was distilled to yield 17.1 g. of 3-phenoxycumene, B.P., 140–150°/5 mm.; $n_D{}^{25}$=1.5574.

*Analysis.*—Calcd. for $C_{15}H_{16}O$ (percent): C, 84.87; H, 7.60. Found (percent): C, 84.82; H, 7.51.

EXAMPLE 44

Preparation of 4-iso-butyldiphenyl ether

A mixture of 48 g. of 4-phenoxy-iso-butyrophenone, 24 g. of 85 percent hydrazine hydrate, 26.4 g. of 85 percent potassium hydroxide, and 150 ml. of diethylene glycol was stirred and heated to 120° for one hour. The reaction mixture was then raised to 200° for one hour, to allow volatile materials to distill out of the mixture. The reaction mixture was then allowed to cool somewhat, 20 ml. of water was added, and the reaction mixture was heated at 200° as before for an additional hour. The reaction mixture was cooled and extracted with ether. The ether extract was washed twice with water, dried over sodium sulfate, and evaporated in vacuo. The residual oil was distilled twice to yield 29.2 g. of 4-iso-butyldiphenyl ether, B.P., 121–130°/0.1 mm.; $n_D^{25}$=1.5461.

*Analysis.*—Calcd. for $C_{13}H_{18}O$ (percent): C, 84.91; H, 8.02. Found (percent): C, 84.95; H, 7.97.

EXAMPLE 45

Preparation of 4-neo-pentylcumene 4-neo-pentylcumene, B.P., 65–68°/0.7 mm.;

$$n_D^{25}=1.4857,$$

was prepared according to the method of Example 44 from 4-cumenyl-tert-butyl ketone.

*Analysis.*—Calcd. for $C_{14}H_{22}$ (percent): C, 88.35; H, 11.65. Found (percent): C, 88.13; H, 11.42.

In the practice of this invention, one of the anti-inflammatory agents disclosed herein is administered to a subject suffering from an inflammatory condition in dosages of from about 1.0 to about 100 mg./kg. of body weight daily, either in single or divided doses. If divided doses are utilized, the anti-inflammatory agent is generally administered every 4 to 6 hours. Since some of the anti-inflammatory agents used in the practice of this invention do not possess analgesic activity, it may be preferred to administer the agent in combination with an analgesic agent, such as aspirin or *d*-propoxyphene, until such time as the swelling, tenderness, decreased mobility, and the like has subsided. While oral administration is the preferred route of administration, the anti-inflammatory agents disclosed herein can also be administered parenterally or as rectal suppositories.

Since many of the compounds employed in the practice of this invention are oils, they may first be adsorbed onto an inert carrier such as talc, silica gel, or the like before they are formulated into capsules, tablets, pills, powders, or granules. Such solid dosage forms for oral administration can also comprise, as is normal practice, additional substances other than inert diluents, e.g., lubricating agents such as magnesium stearate. In the case of capsules, tablets, and pills, the dosage forms may also comprise buffering agents. Tablets and pills can additionally be prepared with enteric coatings. These compounds can also be incorporated into soft gelatin capsules.

Liquid dosage forms for oral administration include such pharmaceutically acceptable forms as emulsions, solutions, suspensions, syrups, and elixirs containing inert diluents commonly used in the art, such as water or a suitable oil.

In formulating the compounds of this invention in liquid dosage forms for oral administration, it may be preferred to dilute the agent to be formulated with a suitable oil such as peanut oil, cottonseed oil, sesame oil, or corn oil or the like. Such diluted mixture comprises the internal phase of the emulsion. Flavoring agents, sweetening agents and the like are dissolved in water which acts as the external phase of the emulsion. Besides inert diluents, such compositions can also include adjuvants such as wetting agents, emulsifying and suspending agents, and sweetening, flavoring, and perfuming agents.

Compositions for rectal administration or suppositories which may contain in addition to the active substances, excipient; such as cacao butter or a suppository wax.

The dosage of active ingredient in the compositions of this invention may be varied; however, it is necessary that the amount of the active ingredient shall be such that a suitable dosage form is obtained. The selected dosage depends upon the desired therapeutic effect, on the route of administration, and on the duration of the treatment. Generally, dosage levels of between 1.0 to 100 mg./kg. of body weight daily are administered to mammals to obtain effective relief of inflammation, pain, and with some compounds, fever. However, prescribed doses of one or more of these compounds in a suitable formulation will probably range from about 50 mg. to 1000 mg. 1 to 4 times a day depending upon the patient body weight, the condition being treated, and other factors of concern to the patient's physician.

EXAMPLE 46

Capsule formulation

|  | Percent |
|---|---|
| 4-phenylcumene | 60 |
| Silica gel (Syloid 244 ®) | 40 |

The 4-phenylcumene is mixed with silica gel in a suitable mixer to produce a homogeneous powder. The powder may be packed into suitable size empty gelatin capsules for administration of the drug. Typically, a No. 00 gelatin capsule has been found to hold 0.55 g. powder, equivalent to 330 mg. drug. Other ingredients may be added according to the art for the purpose of improving performance of processing machines, assisting in disintegration of the unit dose, improvement of compactability, etc.

Other materials, of which silica gel is only one example, may be used, either singly or in combination, to adsorb and convert the compounds of subject patent which are oily in nature, to a dry powder.

EXAMPLE 47

Soft elastic capsule formulation 4-phenylcumene may be encapsulated in a soft gelatin film, either neat or mixed with a suitable liquid diluent such as a vegetable oil. Other ingredients may be added if required for purposes such as improving dispersibility, promoting absorption, etc. Encapsulation may be accomplished by any suitable machine, such as the Scherer rotary die machine described in "Remington's Pharmaceutical Science," 13th ed., and well known in the art.

EXAMPLE 48

Emulsion formulation

|  | G. |
|---|---|
| 4-phenylcumene | 1.33 |
| Soybean oil | 26.7 |
| Span 60® | 2.27 |
| Tween 60® | 0.40 |
| Sucrose | 33.3 |
| Methylparaben | 0.1 |
| Propylparaben | 0.1 |
| Peppermint oil | 0.05 |
| Water, q.s. 100 ml. | |

Dose: 15 ml., equivalent to 200 mg. drug.

Span 60® is sorbitan monostearate, Atlas Chemical Industries Inc.
Tween 60® is polyoxyalkylene derivative of sorbitan monostearate, City Chemical Corp., New York, N.Y.

The Span 60® and soybean oil are mixed and heated to 70° C. Tween 60® and parabens are dispersed in approximately 100 ml. water at 70° C. and sucrose is added. The oil phase is added to the aqueous phase in a suitable mixer such as a Waring Blendor and mixed to produce a milky product. After cooling, the 4-phenylcumene and peppermint oil are added, and the mixture is agitated again.

EXAMPLE 49

Suppository formulation

| | Percent |
|---|---|
| 4-phenylcumene | [1] 15.5 |
| White wax, USP | 4.0 |
| Theobroma oil, USP | 80.5 |

[1] By weight.

White wax is dissolved in the 4-phenylcumene with the aid of gentle heat. Theobroma oil is shaved and added to the mixture slowly. After the theobroma oil has been completely melted, with the aid of additional heat as required, the mixture may be poured into suppository molds of suitable size for the desired dose; e.g., a 2.58 g. suppository of the above mixture yields a 400 mg. dose of 4-phenylcumene.

EXAMPLE 50

Tablet formulation

| | Percent |
|---|---|
| 4-phenylcumene | 15.0 |
| Silica gel | 10.0 |
| Avicel® | 66.0 |
| Starch flowable | 7.5 |
| Stearic acid | 1.5 |

Avicel® is microcrystalline form of cellulose, American Viscose Corp., Merck Index, eighth edition, page 220.

4-phenylcumene is mixed with silica gel to produce a dry powder which may be blended with the remaining ingredients, previously blended. The formulation may then be compressed by a suitable tablet machine to produce tablets of desired weight, typically 667 mg. equivalent to 100 mg. 4-phenylcumene.

EXAMPLE 51

Anti-inflammatory effect of 4-phenylcumene on ultraviolet-induced erythema in guinea pigs The effects of various formulations of 4-phenylcumene were evaluated on the development of ultraviolet-induced erythema on albino guinea pig skin. The formulations were administered orally, rectally and subcutaneously.

Methods.—A modification of the Winder et al. (1958) method was used to measure the anti-inflammatory activity of this agent. Albino guinea pigs of either sex weighing 225–300 grams were shaved on the back and chemically (Nair®, Lotion Hair Remover, Carter Products, New York, N.Y.) depilatated 18–20 hours before exposure to ultraviolet light. The animals were fasted overnight. Immediately after the guinea pigs were treated with a test compound, a gummed notebook paper reinforcement was placed on their backs and they were exposed to a high intensity ultraviolet light for 7 seconds. The ultraviolet light source was a Hanovia Lamp (Kromayer-Model 10) which was placed in contact with the skin of the guinea pig's back. After exposure, the reinforcements were removed and the back wiped clean with a water soaked gauze sponge. The unexposed area under the reinforcement provided an area of contrast for grading the erythema. The animals were randomized and placed in clear plastic partitioned holders 10 x 20 cm. wide and 15 cm. high. Beginning one hour after exposure and thereafter at half-hour intervals for another 1½ hours, the degree of resulting erythema was graded by an arbitrary scoring system based upon the degree of contrast and redness formed. Anti-inflammatory agents delay the development of the erythema and therefore have their greatest effect at the initial grading periods. Therefore, the scores were weighed by a factor of 4, 3, 2, and 1 at the 1.0, 1.5, 2.0, and 2.5 hour scoring times respectively. The erythema was graded as follows:

Erythema scoring system

Appearance of exposed areas

Score:
- 0 ——— No redness and no contrast.
- 1 ——— Slight redness with a faint reinforcement outline.
- 2 ——— Slight to moderate redness with a distinct outline.
- 3 ——— Marked redness with a distinct circular outline.

Total scores from each treatment group of four guinea pigs were compared to the control treatment and the percent inhibition calculated as follows:

$$100 \times \frac{\text{Control} - \text{Treatment}}{\text{Control}} = \text{Percent inhibition}$$

The formulations of Compound 65268 tested were as follows:

| | Vehicle | Route of administration |
|---|---|---|
| 1 | 1% methyl cellulose suspension | Oral and subcutaneously. |
| 2 | Suspension (silica gel) | Oral. |
| 3 | Emulsion | Do. |
| 4 | 15.5% theobroma oil suppositories | Rectal. |

Results.—The oral dose of 4-phenylcumene that produces a 50% inhibition of the erythemic response ($ED_{50}$) in the methyl cellulose suspension was determined to be 4.0 mg./kg. The response to subcutaneous administration of this formulation was not greatly different.

The compound, when adsorbed on Silica Gel (Syloid 244) and administered in a water suspension at a dose of 50 mg./kg. orally, produced a 92% inhibition of the erythemic response.

Emulsion: When administered orally at a dose of approximately 38 mg./kg., the emulsion produced a 79% inhibition of the erythemic response.

The theobroma oil suppositories administered rectally at an approximate dose of 35 mg./kg. produced a 50% inhibition of the erythemic response.

Conclusions.—4-phenylcumene was found to be effective in inhibiting the erythemic response to ultraviolet-induced erythema in guinea pigs in all of the formulations tested.

References.—Winder, C. V.; Wax, J.; Burr, V.; Been, M.; and Posiere, C. E.: A Study of Pharmacological Influences on Ultraviolet Erythema in Guinea Pigs. Arch. Int. Pharmacodyn. 116: 261, 1958.

I claim:
1. The method of treating inflammatory conditions in mammals which comprises administering to a mammalian subject from 1 to 100 mg./kg. daily of a compound of the formula

$$Ar\text{—}R$$

wherein

Ar represents an aryl moiety selected from the group consisting of 4-cyclohexylphenyl, 4-(1-cyclohexenyl)phenyl, 4-biphenylyl, 4-iso-butylphenyl, 4-cyclohexyl-3 - chlorophenyl, 4 - isopropylphenyl, 4 - (1 - cyclooctenyl)phenyl, 4 - cyclooctylphenyl, 4' - fluorobiphenylyl, 4-tert-butylphenyl, 4-(2-norbornyl)phenyl, 4-n-propylphenyl, 4-n-butylphenyl, 4-sec-butylphenyl, 4-cyclopentylphenyl, 4-neo-pentylphenyl or 4-cyclobutylphenyl; and R represents iso-propyl, iso-propenyl, iso-butyl, or n-butyl, with the limitations that when R is n-butyl, Ar is 4-biphenylyl.

2. The method of claim 1 wherein the compound is 4-phenylcumene.

3. The method of claim 1 wherein the compound is 4-iso-butyl-α-methylstyrene.

4. The method of claim 1 wherein the compound is 4-iso-butylcumene.

5. The method of claim 1 wherein the compound is 4-cyclohexyl-α-methylstyrene.

6. The method of claim 1 wherein the compound is 4-cyclohexylcumene.

7. The method of claim 1 wherein the compound is 4-cyclohexyl-3-chloro-α-methylstyrene.

8. The method of claim 1 wherein the compound is 4-iso-propylcumene.

9. The method of claim 1 wherein the compound is 4-iso-propyl-α-methylstyrene.

10. The method of claim 1 wherein the compound is 1-(4-cumenyl)cyclooctene.

11. The method of claim 1 wherein the compound is 4-cyclooctylcumene.

12. The method of claim 1 wherein the compound is 4-(4-fluorophenyl)-α-methylstyrene.

13. The method of claim 1 wherein the compound is 4-(4-fluorophenyl)cumene.

14. The method of claim 1 wherein the compound is 4-tert-butyl-α-methylstyrene.

15. The method of claim 1 wherein the compound is 4-(2-norbornyl)cumene.

16. The method of claim 1 wherein the compound is 4-n-propylcumene.

17. The method of claim 1 wherein the compound is 4-n-butyl-α-methylstyrene.

18. The method of claim 1 wherein the compound is 4-sec-butyl-α-methylstyrene.

19. The method of claim 1 wherein the compound is 4-cyclopentylcumene.

20. The method of claim 1 wherein the compound is 4-(1-cyclohexenyl)cumene.

21. The method of claim 1 wherein the compound is 4-neo-pentylcumene.

22. A pharmaceutical preparation in dosage unit form adapted for administration to obtain an anti-inflammatory effect comprising per dosage unit, an anti-inflammatory effective, nontoxic amount within the range of from about 50 to about 500 milligrams of a compound selected from the group consisting of 4-phenylcumene,
4-isobutyl-α-methylstyrene,
4-isobutylcumene,
4-cyclohexyl-α-methylstyrene,
4-cyclohexylcumene,
4-cyclohexyl-3-chloro-α-methylstyrene,
4-isopropylcumene,
4-isopropyl-α-methylstyrene,
4-(4-cumenyl)cyclooctene,
4-cyclooctylcumene,
4-(4-fluorophenyl)-α-methylstyrene,
4-(4-fluorophenyl)cumene
4-tert-butyl-α-methylstyrene,
4-(2-norbornyl)cumene,
4-n-propylcumene,
4-n-butyl-α-methylstyrene,
4-sec-butyl-α-methylstyrene,
4-cyclopentylcumene,
4-(1-cyclohexenyl)cumene,
4-neo-pentylcumene, and a pharmaceutical diluent.

23. A pharmaceutical preparation in accordance with claim 22 in a form adapted for oral administration.

24. A pharmaceutical preparation in accordance with claim 22 wherein the compound is 4-phenylcumene.

25. A pharmaceutical preparation in accordance with claim 23 wherein the compound is 4-phenylcumene.

References Cited

Chem. Abst., vol. 66 (1967) 46668q.

STANLEY J. FRIEDMAN, Primary Examiner

U.S. Cl. X.R.

424—263, 275, 337, 340, 341, 356

PO-1050
(5/69)

UNITED STATES PATENT OFFICE
CERTIFICATE OF CORRECTION

Patent No. 3,745,223          Dated July 10, 1973

Inventor(s) Winston S. Marshall

It is certified that error appears in the above-identified patent and that said Letters Patent are hereby corrected as shown below:

In Column 3, line about 47, "$ED_5$" should be --$ED_{50}$--.

In Column 4, line about 32, "$H^{\ominus}$" should be --$H^{\oplus}$--.

In Column 5, line 2, "recrystal-" should be --crystal--.

All in Column 6: in line 35, "89.70" should be --90.15-- and "10.13" should be --10.33--; and in line 61, "fluorobiphenyl" should be --fluorobiphenylyl--.

In Column 7, line 6, "etxracts" should be --extracts--.

In Column 8, line 2, "has" should be --had--.

In Column 10, line 49, "Science" should be --Sciences," and in the same column, line 73, "Blendor" should be --Blender--.

In Column 12, line 2, "areas" should be --area--, and in the same column, line 65, "iso-butyl" should be deleted.

All in Column 14: in line 11, the first occurrence of "4" should be --1--; in line 21, --and-- should be added after "4-(1-cyclohexenyl)cumene,"; and in line 22, the comma should be a semi-colon.

Signed and sealed this 4th day of February 1975.

(SEAL)
Attest:

McCOY M. GIBSON JR.
Attesting Officer

C. MARSHALL DANN
Commissioner of Patents